United States Patent

[11] 3,614,492

[72] Inventors Kenji Yatsushiro
Chicago;
George F. Kuchuris, Westchester, both of Ill.
[21] Appl. No. 45,118
[22] Filed June 10, 1970
[45] Patented Oct. 19, 1971
[73] Assignee Controls Company of America
Melrose Park, Ill.

[54] BIDIRECTIONAL MOTOR
2 Claims, 2 Drawing Figs.
[52] U.S. Cl. .................................................. 310/41
[51] Int. Cl. ............................................... H02k 7/118
[50] Field of Search ........................................ 310/41, 75, 76, 97, 162, 163, 164, 156

[56] References Cited
UNITED STATES PATENTS
| | | | |
|---|---|---|---|
| 3,123,192 | 3/1964 | Wagner | 310/41 X |
| 3,406,303 | 10/1968 | Erickson | 310/41 UX |
| 2,722,297 | 11/1955 | Gates | 310/41 UX |

FOREIGN PATENTS
| | | | |
|---|---|---|---|
| 1,443,290 | 5/1966 | France | 310/41 |
| 588,000 | 5/1947 | Great Britain | 310/41 |

*Primary Examiner*—D. F. Duggan
*Assistant Examiner*—B. A. Reynolds
*Attorneys*—John W. Michael, Gerrit D. Foster, Bayard H. Michael, Paul R. Puerner, Joseph A. Gemignani, Andrew O. Riteris and Spencer B. Michael ABSTRACT: The Y-shaped stop device frictionally engages the gear shaft and tends to rotate with the gear. The freedom of movement of the device is restricted by the selector to permit a selected arm of the Y to be effective. If the pinion gear starts in the wrong direction, the stop wing carried by the rotor will strike the effective arm which has been frictionally rotated into a position which insures optimum starting conditions for rotation in the desired direction. Upon engagement the rotor starts in the desired direction and the friction acting on the stop device moves the arm clear of the path of the stop wings. The selector limits movement of the stop device to keep the other arm clear of the stop wings.

BIDIRECTIONAL MOTOR

BACKGROUND OF THE INVENTION

The most pertinent prior art known is W. E. Fritz U.S. Pat. No. 2,985,778 which jams a rack segment into the pinion, which does not optimize conditions since engagement between the rack and pinion can happen at various points on the tooth profile or tip. In Fritz, engagement occurs at random with respect to the position of the rotor poles and does not necessarily occur when the rotor poles are positioned for maximum torque.

SUMMARY OF INVENTION

The directional control device set forth in the Abstract provides a simple and effective means for controlling the direction of rotation of a synchronous motor. The Y-shaped stop device with its two arms permits but one arm to interfere with a stop wing on the rotor with respect to either direction of rotation, i.e. clockwise or counterclockwise. In addition, the use of a stop wing permits proper orientation with respect to the rotor poles so that when the wing strikes the stop device, the rotor poles are in a position corresponding to maximum starting torque in the desired direction. This greatly enhances the proper operation of the motor since torque will be at a maximum, thereby insuring rotation in the desired direction with high starting torque. The control can change motor direction while the motor is running or direction can be selected before starting.

DESCRIPTION OF PREFERRED EMBODIMENT

Figure 2:
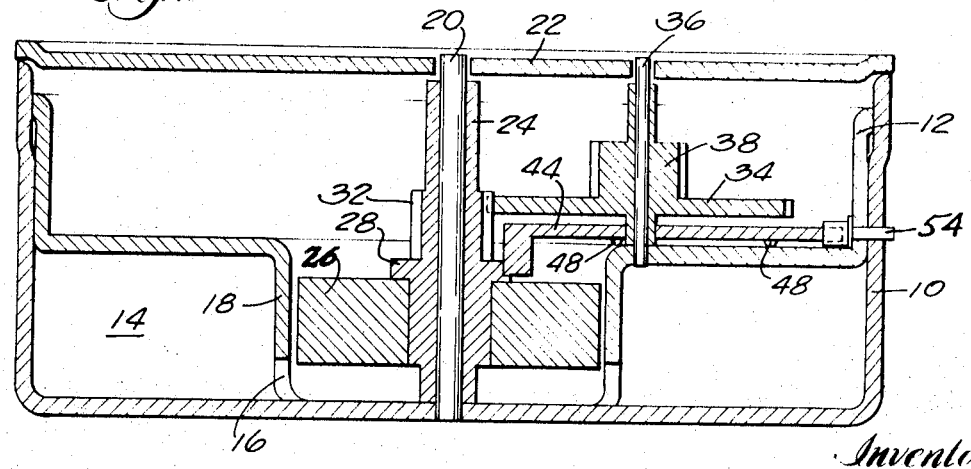
FIG. 2 is an enlarged plan view of a portion of the control.

Motor case 10 is divided by gear case 12 with the coil in space 14. The stator poles 16,18 are formed of the motor case and gear case, respectively. Shaft 20 is fixed in the motor case and the cover 22. The plastic hub 24 is self-journaled on the shaft and supports the permanent magnet rotor 26. As seen best in FIG 2, the hub has an enlarged portion 28 above the rotor and from which the opposed wings 30,30 project. Pinion gear 32 is press fitted on the hub 24 to drive (first) gear 34 journaled on shaft 36 fixed in the gear case and the cover. Gear 34 is provided with a reduced diameter gear 38 which drives another gear (not shown) but this is not important since the first gear 34 could just as well be an idler.

Figure 1:
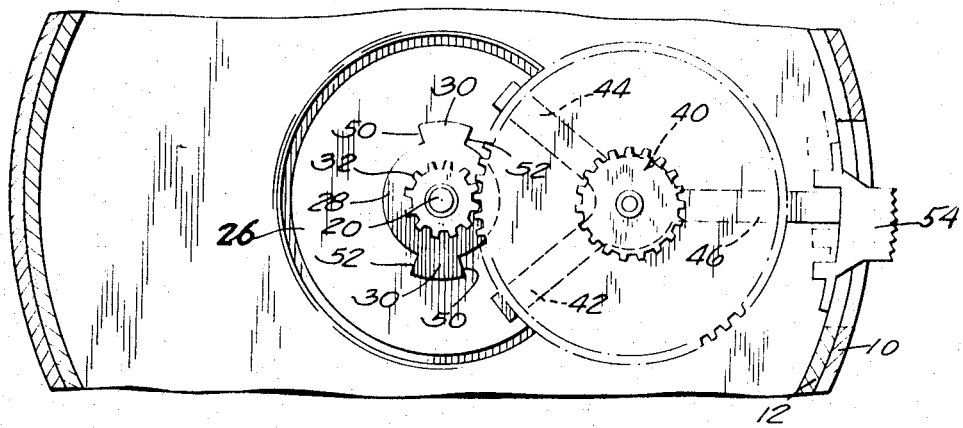
FIG. 1 is a cutaway view in cross section showing the control device in a synchronous motor but showing only the pertinent portion of the gear train to keep the disclosure simple.

The directional control includes the Y-shaped (see FIG. 1) device 40 having a friction fit on the hub of gear 34 so it tends to rotate with the gear. Device 40 includes stop arms 42,44 and a control leg 46 and has projecting dimples 48 keeping the device spaced from the gear case. The ends of the stop arms 42,44 are turned down to project into the path of the stop wings 30 under certain conditions.

The stop wings have radially disposed stop surfaces 50,52. Either of surfaces 50 can strike stop arm 42 while either of surfaces 52 can strike stop arm 44 when the rotor is rotated counterclockwise (CCW) or clockwise (CW), respectively—assuming, of course, that the stop arms are free to move into interfering position. Control of the directional device 40 is achieved by means of the selector slide 54 slidable (with some resistance) in the housing and projecting from the housing for actuation. The selector has a notch receiving the end of the actuator leg 46 and limiting the freedom of movement of the leg. As illustrated, the leg and the Y-shaped device 40 are in a "run" position—the rotor is rotating CW causing gear 34 to rotate CCW while friction tends to drag device 40 CCW so leg 46 hits the limit of the notch in selector 54. Had the rotor started CCW, device 40 would have dragged CW with stop arm 42 swinging into the path of stop surface 50 on either of the wings 30. Since the stop surfaces 50,52 are radial and can be accurately located relative to the polarization of the rotor, the stop wings function to stop rotation in the maximum or optimum starting conditions and the rotor can only start in the desired direction—CW in the example just given. If the selector 54 is moved to the other limit of its movement, stop arm 44 is the potentially effective arm. If the motor is running when the selector is moved, the rotor direction will be changed as soon as arm 44 can swing into position. Since the device 40 is on the first gear, the time for taking effect is extremely short and usually no reverse movement can be detected at the output of the gear train should the motor tend to start in the "wrong" direction.

The stop arms can only be effective against the radial stop surfaces and there is, therefore, no chance of stopping the rotor in other than its optimum position (assuming, of course, that the wings are properly oriented to the rotor poles in manufacture).

We claim:

1. A direction-controlling device for a synchronous motor having a rotor and a pinion mounted on a common shaft for conjoint rotation in either direction comprising:

a stop member mounted for rotation about said shaft with the rotor and pinion and including a plurality of projecting portions, each of which portions has radially disposed stop surfaces facing in opposite directions of rotation, a gear mounted on a second shaft and driven by the pinion, a stop device mounted for rotation about the axis of the gear shaft and having limited frictional engagement with the gear so the stop device tends to rotate with the gear so long as the device is not restrained and permitting the device to remain stationary when restrained while the gear is rotating, said stop device having two stop arms lying on opposite sides of the stop member and dimensioned so that each arm is engageable with one of said stop surfaces on each of the projecting portions of the stop member, engagement of said stop surfaces against said arms always occurring on a line substantially radially disposed relative to the shaft on whcih the rotor and pinion are mounted, a selector arm projecting from said stop device, a selector movable between two positions and including a notch receiving the distal end of the selector arm and permitting limited relative movement of the selector arm relative to the selector whereby in one position of the selector the selector arm is free for movement between a stop position in which the selected stop arm engages the appropriate stop surface on the stop member to prevent rotation of the rotor in a first direction and a run position in which the selected stop arm does not touch the stop member and the rotor is free to rotate in a second direction, said selector being movable to another position in which the selector arm is limited to a range of movement in which the other stop arm is effective to permit or prevent rotation of the rotor in directions opposite to those obtaining when the selector is in its first position.

2. Apparatus according to claim 1 in which the radial stop surfaces are spaced about the center of the rotor shaft so that when the stop surface strikes the effective one of the stop arms the rotor will be in a desired magnetic relationship relative to the stator of the motor.